US010213688B2

(12) United States Patent
Gewicke et al.

(10) Patent No.: US 10,213,688 B2
(45) Date of Patent: Feb. 26, 2019

(54) SOCIAL AND PROCEDURAL EFFECTS FOR COMPUTER-GENERATED ENVIRONMENTS

(71) Applicant: Warner Bros. Entertainment, Inc., Burbank, CA (US)

(72) Inventors: Greg Gewicke, Los Angeles, CA (US); Gary Lake-Schaal, Los Angeles, CA (US); Piotr Mintus, Seattle, WA (US); Lewis Ostrover, Los Angeles, CA (US); Michael Smith, Santa Monica, CA (US)

(73) Assignee: WARNER BROS. ENTERTAINMENT, INC., Burbank, CA (US)

( * ) Notice: Subject to any disclaimer, the term of this patent is extended or adjusted under 35 U.S.C. 154(b) by 11 days.

(21) Appl. No.: 15/255,071

(22) Filed: Sep. 1, 2016

(65) Prior Publication Data
US 2017/0061704 A1 Mar. 2, 2017

Related U.S. Application Data

(60) Provisional application No. 62/210,366, filed on Aug. 26, 2015.

(51) Int. Cl.
*A63F 13/525* (2014.01)
*A63F 13/28* (2014.01)
(Continued)

(52) U.S. Cl.
CPC ............ *A63F 13/525* (2014.09); *A63F 13/28* (2014.09); *A63F 13/30* (2014.09); *A63F 13/58* (2014.09);
(Continued)

(58) Field of Classification Search
None
See application file for complete search history.

(56) References Cited

U.S. PATENT DOCUMENTS 9,566,503 B2 * 2/2017 Lee ........................... A63F 9/24
2006/0105825 A1 * 5/2006 Findlay .................. A63F 13/12
463/4

(Continued)

OTHER PUBLICATIONS

"Evaluating Game Technologies for Training", by Dan Fu, Randy Jensen and Elizabeth Hinkelman, 2008 IEEE Aerospace Conference, Mar. 8, 2008, pp. 1-10. (Year: 2008).*

(Continued)

*Primary Examiner* — James A Thompson
(74) *Attorney, Agent, or Firm* — One LLP

(57) ABSTRACT

A processor provides a simulated three-dimensional (3D) environment for a game or virtual reality (VR) experience, including controlling a characteristic parameter of a 3D object or character based on at least one of: an asynchronous event in a second game, feedback from multiple synchronous users of the VR experience, or on a function driven by one or variables reflecting a current state of at least one of the 3D environment, the game or the VR experience. In another aspect, a sensor coupled to an AR/VR headset detects an eye convergence distance. A processor adjusts a focus distance for a virtual camera that determines rendering of a three-dimensional (3D) object for a display device of the headset, based on at least one of the eye convergence distance or a directed focus of attention for the at least one of the VR content or the AR content.

20 Claims, 9 Drawing Sheets

(51) Int. Cl.
- *A63F 13/30* (2014.01)
- *A63F 13/58* (2014.01)
- *G06T 19/00* (2011.01)
- *G09G 3/00* (2006.01)
- *H04L 29/06* (2006.01)

(52) U.S. Cl.
CPC .......... *G06T 19/006* (2013.01); *G09G 3/003* (2013.01); *H04L 67/38* (2013.01); *A63F 2300/8082* (2013.01)

(56) References Cited

U.S. PATENT DOCUMENTS

| | | | |
|---|---|---|---|
| 2008/0113698 A1* | 5/2008 | Egozy | A63F 13/12 463/7 |
| 2009/0237564 A1* | 9/2009 | Kikinis | H04N 13/0296 348/584 |
| 2014/0274371 A1* | 9/2014 | Helava | A63F 13/10 463/31 |
| 2016/0042566 A1* | 2/2016 | Mao | G06T 19/006 463/32 |
| 2016/0133230 A1* | 5/2016 | Daniels | G06T 19/006 345/633 |
| 2016/0350973 A1* | 12/2016 | Shapira | G06T 19/006 |

OTHER PUBLICATIONS

"Immersive and Perceptual Human-Computer Interaction Using Computer Vision Techniques", by Jinchang Ren, Theodore Vlachos, and Vasileios Argyriou, 2010 IEEE Computer Society Conference on Computer Vision and Pattern Recognition—Workshops, Jun. 18, 2010, pp. 66-72. (Year: 2010).*

* cited by examiner

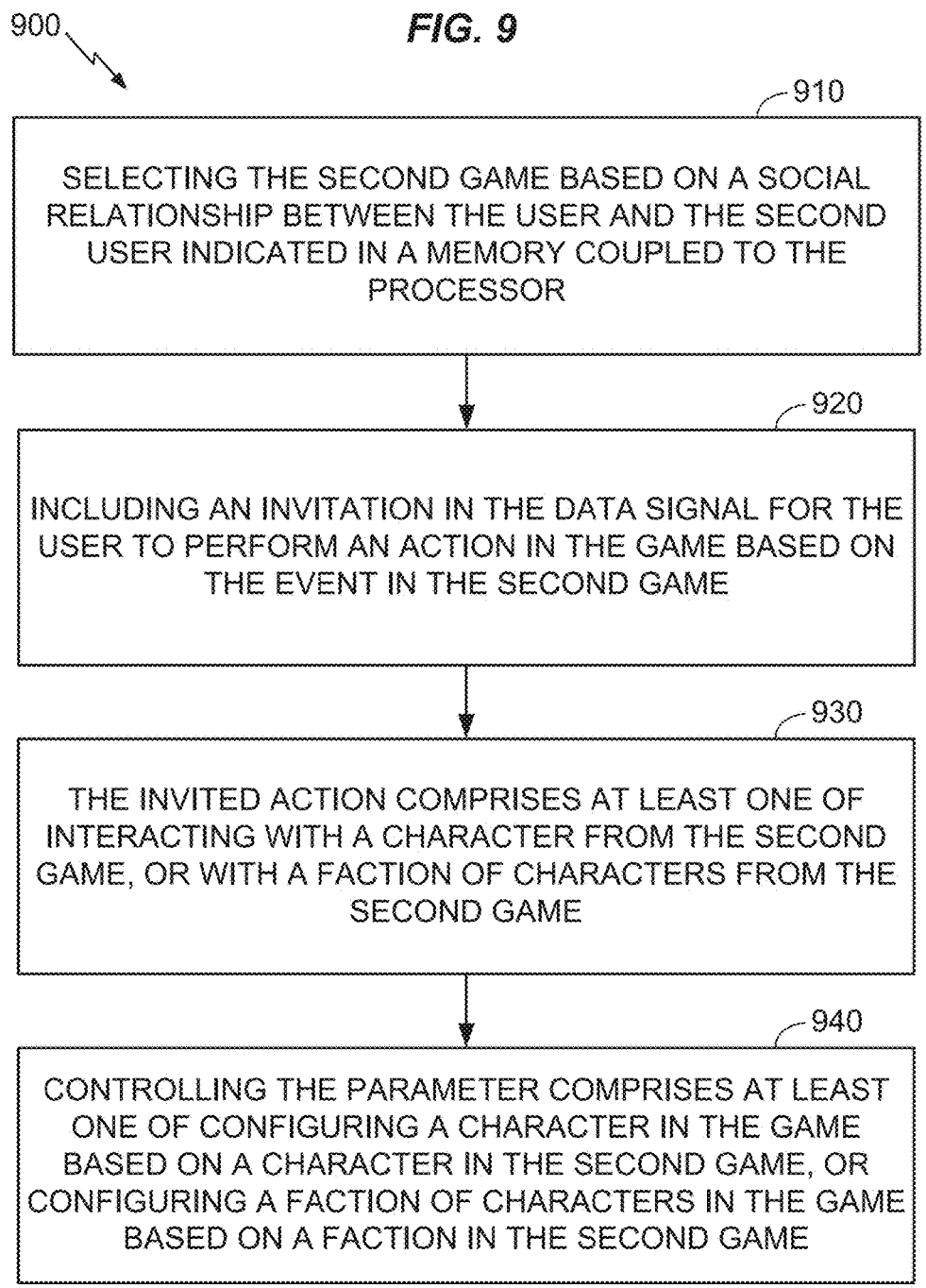

- 1010: RECEIVING THE FEEDBACK FROM MULTIPLE SYNCHRONOUS USERS OF THE VR EXPERIENCE FROM A NETWORK, AND CONTROLLING THE PARAMETER OF THE 3D OBJECT IN RESPONSE TO THE FEEDBACK

- 1020: CONTROLLING THE PARAMETER COMPRISES CHANGING AT LEAST ONE OF A DIMENSION, A SURFACE CONTOUR, AN ANIMATION SEQUENCE, OR A SURFACE TEXTURE OF THE 3D OBJECT

- 1030: CONTROLLING THE PARAMETER COMPRISES CHANGING THE PARAMETER BASED ON AN AGGREGATED VALUE DERIVED IN NEAR REAL-TIME FROM THE FEEDBACK

1110: READING AT LEAST ONE STATE VARIABLE INDICATING THE CURRENT STATE OF AT LEAST ONE OF THE 3D ENVIRONMENT, THE GAME OR THE VR EXPERIENCE, AND PROVIDING THE AT LEAST ONE STATE VARIABLE TO THE FUNCTION

1120: THE AT LEAST ONE VARIABLE COMPRISES A CHARACTER HEALTH STATUS, AND THE FUNCTION COMPRISES DETERMINING AN AMOUNT OF A PREDEFINED MORPH TO APPLY TO A SURFACE CONTOUR OF THE CHARACTER, BASED ON THE HEALTH STATUS

SOCIAL AND PROCEDURAL EFFECTS FOR COMPUTER-GENERATED ENVIRONMENTS

CROSS-REFERENCE TO RELATED APPLICATION

This application claims priority pursuant to 35 U.S.C. § 119(e) to U.S. provisional application Ser. No. 62/210,366 filed Aug. 26, 2015, which is hereby incorporated by reference, in its entirety.

FIELD

The present disclosure relates to the design and operation of three-dimensional ("3D") environments in a computer, for example for online multiplayer video games or virtual reality.

BACKGROUND 3D environments are generated by computers for many applications, including, for example, structured or unstructured video games, online social networks, or anything for which a 3D user interface is useful.

Elements that appear in 3D environments are rendered representations of underlying 3D geometrical objects, also called models. Each 3D object is definable using a set of vertices, faces, face normals, two-dimensional ("2D") textures, and other data. 3D objects may also be described by a set of parameters, for example, width, length, depth, and so forth. 3D geometrical model information generally includes 3D coordinate and/or parameter data, and 2D image data defining colors and other surface attributes of the model. Model information may also include position and orientation information for the model as a whole and/or for portions thereof. For example, a character or other model that can be animated may include an armature of "bones" each of which controls a position and orientation of a subset of vertices that make up the model. Bones of the armature can be independently controlled to animate the character. Data sets that define specific armature movements, for example, walking, running, sitting, and so forth, can be used with model information to create an animated scene in response to user input. Model and scene information can be provided to a render engine with an at least partly user-controlled viewpoint and lighting related information, and other render settings, to produce a video frame. A sequence of such frames made responsive to certain inputs can be used to provide the user experience of the game or virtual reality.

"Virtual reality" is a loosely defined term that has been used for various types of content produced based on 3D computer models, including, for example, various video game content, and animated film content. In this type of virtual reality, a user can navigate through a 3D environment generated based on the computer model, by controlling the position and orientation of a virtual camera that defines a viewpoint for a 2D scene that is displayed on a two-dimensional display screen. A variation of these technologies is sometimes called "augmented reality." In an augmented reality setup, the display technology shows a combination of the user's surroundings that is "augmented" by one or more digital objects or overlays. Augmented reality content may be as simple as textual "heads up" information about objects or people visible around the user, or as complex as transforming the entire appearance of the user's surroundings into a fantasy environment that corresponds to the user's real surroundings.

More recently, "virtual reality" has been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene. In the case of augmented reality content, the viewer may experience the augmented content as if it were a part of, or placed in, the augmented scene. "Augmented reality" may sometime be abbreviated as "AR."

These immersive effects may be provided or enhanced by motion sensors in the headset that detect motion of the user's head, and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body, and adjust the video display(s) accordingly. By leaning in, the user can see the virtual reality scene from a different point of view. By leaning to the side, the user can see the virtual reality scene from a different point of view. This responsiveness to head movement, head position and body position greatly enhances the immersive effect achievable by the headset. The user may be provided the impression of being placed inside or "immersed" in the virtual reality scene.

These immersive virtual reality ("VR") headsets and other immersive technologies are especially useful for game play of various types, which involve user exploration of a modelled environment generated by a rendering engine as the user controls one or more virtual camera(s) using head movement, the position or orientation of the user's body, head, eye, hands, fingers, feet, or other body parts, and/or other inputs. To provide an immersive experience, the user needs to perceive a freedom of movement that is in some way analogous to human visual perception when interacting with reality. Content produced for VR can provide this experience using techniques for real-time rendering that have been developed for various types of video games. The content is designed as a three-dimensional computer model with defined boundaries and rules for rendering as video output. This content can be enhanced by stereoscopic techniques to provide stereoscopic output, sometimes referred to as "3D," and associated with a VR application that manages the rendering process in response to movement of the VR headset, to produce a resulting VR experience. The user experience is very much like being placed inside a rendered video game.

Interactive video games for play on a personal computer or gaming console are sometimes programmed to include non-player characters that interact with player avatars in various ways. For example, it is common in first-person shooter and similar games for the player to face and be required to overcome various hazards caused by an onslaught of non-player characters or other players. Once overcoming these hazards the player may be required to beat a "boss character" to advance to a new level of play. This style of play is almost as old as video games themselves. Non-player characters in such games are provided with programmed behaviors that do not change during game play, apart from random variation that may be built into an algorithm for controlling the character.

Notwithstanding these methods of providing 3D virtual environments, games, and adding variation to behavior of non-player characters, possibilities for enriching the user experience remain.

It would be desirable, therefore, to develop new methods and other new technologies for effects in 3D environments, that overcome these and other limitations of the prior art and enhance the appeal and enjoyment of various 3D environments.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes providing, by a processor, a simulated three-dimensional (3D) environment for one of a game played by a user or a virtual reality (VR) experience in a data signal configured for an output device. The method may further include controlling a characteristic parameter of a 3D object or character included in the simulated 3D environment based on at least one of: an event in a second game played by a second user not in synchrony with the game, feedback from multiple synchronous users of the VR experience, or on a function driven by one or more variables reflecting a current state of at least one of the 3D environment, the game or the VR experience.

In certain embodiments or aspects, the method includes selecting the second game based on a social relationship between the user and the second user indicated in a memory coupled to the processor. The method may further include providing an invitation in the data signal for the user to perform an action in the game, based on the event in the second game. The invited action may include at least one of interacting with a character from the second game, or with a faction of characters from the second game. Controlling the parameter may include at least one of configuring a character in the game based on a character in the second game, or configuring a faction of characters in the game based on a faction in the second game.

In other embodiments or aspects, the method includes receiving the feedback from multiple synchronous users of the VR experience from a network, and controlling the characteristic parameter of the 3D object in response to the feedback. Controlling the parameter may include changing at least one of a dimension, a surface contour, an animation sequence, or a surface texture of the 3D object. For example, controlling the parameter may include changing the parameter based on an aggregated value derived in near real-time from the feedback.

In other embodiments or aspects, the method includes reading at least one state variable indicating the current state of at least one of the 3D environment, the game or the VR experience, and providing the at least one state variable to the function. For example, the at least one variable may include a character health status, and the function may include determining an amount of a predefined morph to apply to a surface contour of the character, based on the health status.

In other embodiments, a method for controlling a VR or AR environment may include detecting, by a sensor coupled to a headset configured for displaying at least one of VR content or AR content, an eye convergence distance for a user of the headset. For example, an orientation of each eye may be tracked to determine a line of sight for each eye based on an assumed or measured geometry of the eye. The distance from the eyes at which the lines of sight intersect may be estimated using trigonometric analysis or the like. The method may further include adjusting, by a processor controlling an output of the headset, a focus distance for a virtual camera that determines rendering of a three-dimensional (3D) object for a display device of the headset, based on at least one of the eye convergence distance or a directed focus of attention for the at least one of the VR content or the AR content.

For example, the adjusting may include setting the focus distance equal to the eye convergence distance. The setting may performed for at least every rendered key frame in a continuous sequence of rendered frames, providing a sustained, continuous effect. In an aspect, the method may include limiting a depth-of-field for at least one of the virtual camera or an associated rendering engine to provide a shallow depth centered on the eye convergence distance.

For complementary example, the adjusting may include setting the focus distance to provide the directed focus of attention based the at least one of the VR content or the AR content. The directed focus may be a value determined by a director of the content, to achieve an intended dramatic or narrative effect. For example, the directed focus of attention may be correlated to a narrative for prerecorded VR content. Whenever using a directed focus of attention, the method may further include limiting a depth-of-field for at least one of the virtual camera or an associated rendering engine to provide a shallow depth centered on the directed focus of attention.

In another aspect, the method may include providing at least one additional sensory cue via an output of the headset, configured for directing attention of a viewer to the focus of attention. The at least one additional sensory cue may be selected from the group consisting of: a prerecorded verbal cue, a sound effect, or a visual effect. For example, a verbal cue of "behind you!" may be output from an audible cue generating module, coupled with an audible and/or visual effect located in the rendered scene 180° behind the current viewing direction of the headset wearer.

Any of the foregoing methods for providing a simulated 3D environment may be implemented in any suitable programmable computing apparatus, by provided program instructions in a non-transitory computer-readable medium that, when executed by a computer processor, cause the apparatus to perform the described operations. Other elements of the apparatus may include, for example, a display screen, an audio output device, and a user input device, which participate in the execution of the method. In addition to personal computers and game consoles, an apparatus may include a virtual reality device, such as a headset or other display that reacts to movements of a user's head or body to provide the impression of being placed inside of the rendered scene in which the game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 9-11 are flow charts illustrating further optional aspects or operations of the method diagrammed in FIG. 8.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
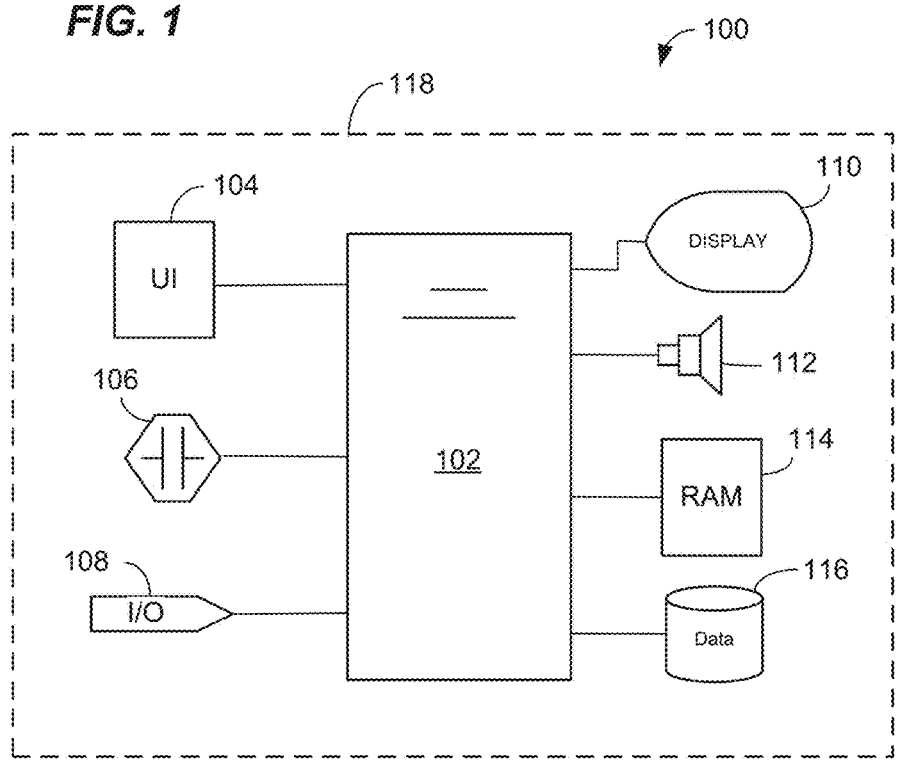
FIG. 1 is a schematic block diagram illustrating aspects of an apparatus for performing methods of controlling a 3D environment as described herein.

Referring to FIG. 1, aspects of a computing apparatus 100 for performing methods of controlling a 3D environment as described herein are illustrated. The apparatus 100 may be used for video gaming, entertainment, social networking, user interfacing or other application, and may include, for example, a processor 102, for example a central processing unit based on 80×86 architecture as designed by Intel™ or AMD™, or a system-on-a-chip as designed by ARM™. The processor 102 may be communicatively coupled to auxiliary devices or modules of the 3D environment apparatus 100, using a bus or other coupling. Optionally, the processor 102 and some or all of its coupled auxiliary devices or modules (examples of which are depicted at 104-116) may be housed within or coupled to a housing 118, for example, a housing having a form factor of a personal computer, gaming console, smart phone, notepad computer, laptop computer, set-top box, or other form factor.

A user interface device 104 may be coupled to the processor 102 for providing user control input to a game process operated by a VR game engine executing on the processor 102. User control input may include, for example, selections from a graphical user interface or other input (e.g., textual or directional commands) generated via a touch screen, keyboard, pointing device (e.g., game controller), microphone, motion sensor, camera, or some combination of these or other input devices. Game input may also be provided via a sensor 106 coupled to the processor 102. A sensor may comprise, for example, a motion sensor (e.g., an accelerometer), a position sensor, a temperature sensor, a location sensor (for example, a Global Positioning System (GPS) receiver and controller), an eye-tracking sensor, or a microphone. The sensor 106 may detect a motion or other state of a user interface display, for example, motion of a virtual-reality headset, or the bodily state of the user, for example, skin temperature or pulse.

The device 100 may optionally include an input/output port 108 coupled to the processor 102, to enable communication between a game engine and a computer network. Such communication may be used, for example, to enable multiplayer games. The methods described herein may be adapted for use with multiplayer games, or with single player games using input from a social network. In a single player game, non-player characters interact with a single player, and game play depends in part on different games played at different times by one or more members of the single player's social network. In a multi-player game, non-player characters may evolve similarly, and interact with multiple different players at the same time, or at different times, likewise including social network input. The system may also be used for non-gaming multi-user applications, for example social networking, group entertainment experiences, instructional environments, and so forth.

A display 110 may be coupled to the processor 102, for example via a graphics processing unit (not shown) integrated in the processor 102 or in a separate chip. The display 110 may include, for example, a flat screen color liquid crystal (LCD) display illuminated by light-emitting diodes (LEDs) or other lamps, a projector driven by an LCD display or by a digital light processing (DLP) unit, or other digital display device. The display device 110 may be incorporated into a virtual reality headset or other immersive display system. Video output driven by a game engine operating on the processor 102, or other application for coordinating user inputs with events simulated in a 3D environment, may be provided to the display device 110 and output as a video display to the user (also referred to herein as the "player"). Similarly, an amplifier/speaker or other audio output transducer 112 may be coupled to the processor 102 via an audio processing system. Audio output correlated to the video output and generated by the game engine or other application may be provided to the audio transducer 112 and output as audible sound to the user.

The 3D environment apparatus 100 may further include a random access memory (RAM) 114 holding program instructions and data for rapid execution or processing by the processor during controlling a 3D environment. When the device 100 is powered off or in an inactive state, program instructions and data may be stored in a long-term memory, for example, a non-volatile magnetic, optical, or electronic memory storage device 116. Either or both of the RAM 114 or the storage device 116 may comprise a non-transitory computer-readable medium holding program instructions, that when executed by the processor 102, cause the device 100 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Figure 2:
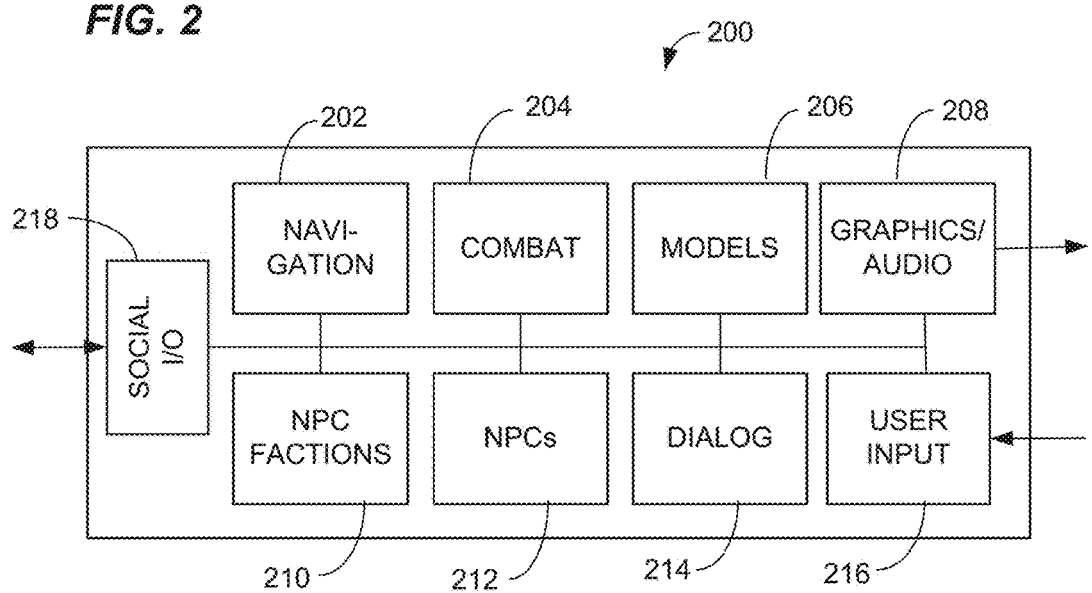
FIG. 2 is block diagram illustrating aspects of functional modules making up an application for performing methods of controlling a 3D environment as described herein.

FIG. 2 illustrates aspects of functional modules making up an application for performing methods of controlling a 3D environment, for example, a game engine or other application for coordinating user inputs with events simulated in a 3D environment 200. A game engine or the like may also include other modules, for example a database module holding game and parameter data or a chat module, which are not illustrated. Data signals generated by a user input device may be provided to a user input processing module 216. Based on the data signals and the context in which received (e.g., game state at time of receipt), the data processing module 216 may set variables or write data to memory locations that are used by other modules of the game engine 200, operating concurrently or sequentially with operation of the user input module 216. More detailed algorithms for performing functions of the game engine are described elsewhere below.

A navigation module 202 may manage position and movement of the player's (or non-player user's) avatar, or players' respective avatars, through a world map established for a particular game, in response to player input, map features, event outcomes and other game states, including positions and states of non-players characters. The navigation module may similarly manage position and movement of non-player characters through a world map. It should be appreciated that a world map may be divided into different levels. The navigation module may control access of a player avatar to different levels. For example, a player may be required, via limits placed on the player's avatar, to complete a certain task before advancing to a next level. As used herein, the game avatar controlled in response to player input so as to represent the player in game play or other non-gaming interactive 3D environment may sometimes be referred to as the "player avatar."

A combat module 204 may manage adversarial encounters between avatars, between avatars and non-player characters, or between non-player characters. The module 204 may determine outcomes of encounters in response to player input, status of avatar parameter's, status of non-player character parameters, presence of accessory objects (e.g., weapons, charms, etc.), game location, game time, or other inputs. Examples of non-player character parameters are provided later in the specification. Non-player characters may sometimes be referred to as "bots" or "robots" in the context of computer games. The combat module may generate actions of non-player characters based on character parameters using a code that randomly generates actions, selects from a set of available actions, or both. The combat module may compare then player avatar action, player avatar parameters, non-player character actions, and non-player parameters, and determine an outcome. For example, a combat encounter may be coded as a "do" loop of processes that are repeated until the loop is exited, either by defeat of one of the parties or some other terminal event. For further example, the combat engine can decrement (and in some cases, increment) a health status of the player avatar and the non-player character, based on their respective actions (which may, in turn, depend on their traits). Once a health status is depleted to zero, the combat is over and the remaining player or character is the winner. This simple model may be varied, as desired. Once an outcome of an encounter is determined, the module 204 may record a result for use by other modules of the game engine 200. In addition, the combat module 204 may provide information regarding progress of the combat to a render function in the audio-video output module 208, so the player can view progress of the combat while participating in it, or while merely observing it if between non-player characters.

A model management module 206 may manage three-dimensional or two-dimensional models used for rendering non-player characters. The module 206 may alter a state of these models in response to changes in non-player character parameters or avatar parameters. For example, the combat module 204 may provide an indication that a character lost a combat event by suffering a particular type of injury. In response to the indication, the model management module 206 may alter a texture and/or geometry of the model to reflect a scar from the particular injury suffered. The next time the non-player character is rendered, the scar will appear where there was none before.

In an aspect, model management module 206 may create attributes for game assets using a specified procedure or algorithm. Such attributes may be referred to herein as procedurally-generated attributes, or "procedural attributes" for short. Procedural 2D textures are known in computer graphics, and may provide advantages such as memory conservation without loss of detail. Parameterization of 3D objects is also known. In the context of a game or VR environment, a procedure or algorithm may be used to drive a 2D attribute of a texture, or one or more parameters or a parametrized 3D model. For example, parameters of a 2D texture (e.g., color value, frequency, scale, position, or one or more variables of a pattern-generating algorithm) may be varied as a function of a game or VR environment state, or based on feedback from a group of users (e.g., crowd-sourced input). For further example, parameters of a 3D model may similarly be varied based on a game state, non-player character state, or feedback from a group of users.

A faction management module 210 may manage factional relationships between non-player characters in one or more factions, in response to game events. The module 210 may use factional relationships to determine which non-player characters are affected by a game event. For example, if a higher-lever character in a faction is killed, a lower-level character may be promoted. Accordingly, the module 210 may update and track changes in factional relationships. The module 210 may further use information about factional relationships to determine a nature of a parameter change. For example, if a first non-player character in a faction has a negative relationship with a second non-player character, and something negative happens to the first player, parameters of the second player may be changed in some positive way such as increased power or additional skills. The faction management module 210 may interact with a social networking input/output module 218.

The social networking input/output module 218 may obtain information from a database that is supplied with controlling a 3D environment data from members of the player's social network, and provide controlling a 3D environment data to the database. The social networking input/output module 218 may further manage social network membership and rights using the game interface, or in cooperation with a separate interface (e.g., a browser). Social network information may be used, for example, to enable the player to gain access, in a present game, to a faction developed by a friend in another game. For further example, social network information may be used to configure a non-player character, or a set of interactions with a non-player character. For example, if a first player's avatar is killed by a certain non-player character during a session of a first game, friends in a social network of the first player who have registered as users of the game application may receive an invitation to "avenge" the killing. Any one or more friends (e.g., a second player) who accept the invitation may, through the social networking input/output module 218, receive character definition information for the non-player character in an independent game process that each friend is using.

The definition information can be used to recreate the non-player character in a second game process in use by a second player, including defining or modifying a faction that includes the non-player. If the second player is successful in killing the non-player character, the success may be shared with the first player, who may thereby obtain the "death" of the non-player character in the first game. Once the second player has killed the character, the second player may elect to expunge the character's faction from the game instance in use by the second player, and resume play as before. In alternatives, the imported non-player character may be added to an equivalent position in a faction of the second player's game, optionally displacing another non-player character or occupying a temporary "guest" role in the foreign faction. The displaced non-player character may be removed from the game, moved to a different spot in the faction, or held in reserve pending other non-player character events, such as by being placed in a queue waiting for the next suitable spot in a faction to open up or for its original position to be restored. Once the imported non-player character is killed, the displaced non-player character may be replaced in the faction, either unaffected by the killing, or affected in some way. In alternatives, the faction may respond as it would to the death of any other faction member, with the fate of the displaced non-player character handled in some other way as outlined above.

A non-player character module 212 may manage spawning and control of non-player characters in the game, based on the game state and current state of the non-player parameters. This module may provide artificial intelligence for controlling non-player character actions to simulate self-directed activity, optionally in response to activity by a player-controlled avatar, or in response to activity by another non-player character. "Spawning" refers to causing a non-player character to appear at a particular place on the game map, after being absent from the map for a period of time. In cases where a non-player character is imported from another game via the social networking input/output module 218, the non-player character module may manage the importation and disposition of the imported character, for example using one of the processes outlined in the foregoing paragraph.

A dialog module 214 may control dialog assigned to non-player characters in response to past game events and changes in character parameters. Accordingly, the dialog of the non-player character will evolve as the character survives and accretes additional history. In this way, a nemesis character with some depth can be generated, which communicates using different phrases and meanings based on its history.

An audio-video output module 208 may generate an audio-video signal based on the current game state. A video output component may generate a video signal for a display device based on viewpoint, position, and lighting data, and on geometrical data for the game map, characters, avatars, and auxiliary objects, using a rendering engine. An audio output component may generate an audio signal based on dialog from the dialog component 214, position or orientation of a user on the game map or relative to one or more audio sources, and or other input.

Figure 3:
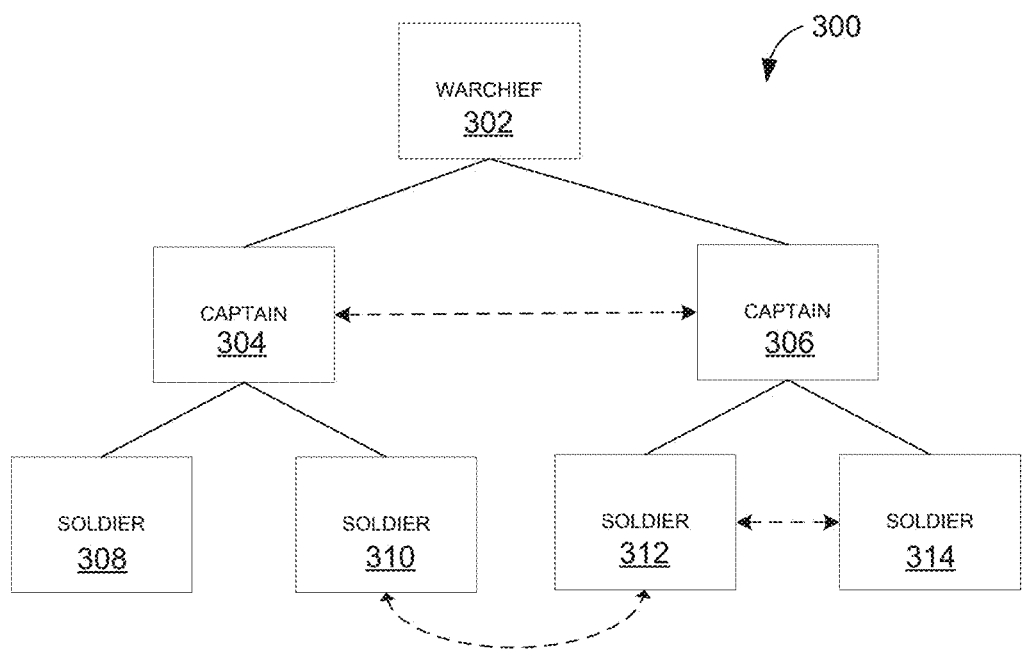
FIG. 3 is a concept diagram illustrating a character hierarchy.

FIG. 3 illustrates examples of various hierarchical and non-hierarchical relationships within a faction 300 of non-player characters managed by a game engine or the like, for example, by a faction manager module 210. Other factions with different relationships may also be useful.

In the illustrated faction 200, for example, a warchief non-player character 302 may reside at the top of the hierarchy 300. The game may include a set number of warchiefs (for example, five) each set over a faction. Each warchief have the absolute loyalty of the captains 304, 306 that make up their bodyguard and may be much tougher than captains. In an aspect of game play, the game engine may withhold warchiefs, but not captains, from game play initially. The game engine may require warchiefs to be drawn out by having a dominated nemesis bring one out or complete a mission that will attract the warchief's attention. In another aspect, a warchief may possess privileges, skills or powers that characters of lower rank cannot have. For example, warchiefs may be immune from death threats, except from characters of a certain rank, such as captain. Warchiefs may respond to threats by increasing their bodyguard count. A warchief may have non-hierarchical relationships (not shown) with warchiefs of other factions, for example, rivalries or alliances.

Captains 304, 306 may be the most common rank of nemeses active in game play. Each warchief may be above one or more captains; two are shown in FIG. 3 for illustrative simplicity, but greater numbers of captains may also be used. Captains may be much more powerful than the regular soldiers by possessing traits that gives them increased power, while also giving them specific weaknesses to exploit. Captains may sometimes be in the service of a warchief, being their loyal bodyguard, and will join with them when they appear in the region. These non-player characters may be the most dynamic as they are the ones who fight and complete missions to increase their power if left unaccounted. Captains may also be death threatened, by soldiers or other captains. A captain may have non-hierarchical relationships (shown in dashed line) with captains in the same faction, for example, friendships or rivalries.

Soldiers 308, 310, 312, 314 may reside at a third (lower) level of the faction 300 hierarchy, below the captains 304, 306. Although two soldiers are depicted per captain, a single soldier, or more than two soldiers, may also be used. Soldiers may be most common foe that a player avatar meets during game play. A soldier may be promoted to captain in response to certain game events. For example, a soldier may be promoted for accomplishing some great feat, such as killing the player avatar, killing a captain, or may be assigned an "opportunist" trait rendering the character capable of taking up the empty position of a recently deceased captain. Any soldier is capable of becoming a captain, and a soldier may be "dominated" and won over by a player avatar. Accordingly, a player may, by allowing their avatar to be killed by a regular soldier that that the player has dominated, obtain a more powerful captain status for the dominated character. This may help the player progress in the game. In addition, a soldier may have non-hierarchical relationships (shown in dashed line) with soldiers in the same faction, for example, friendships or rivalries. Further aspects of managing a faction or non-player character using a game engine or the like may be, for example, as described in U.S. Provisional Patent Application Ser. No. 62/138,920, filed on Mar. 26, 2015, which is incorporated herein by reference, in its entirety.

An entire faction 300 may be imported into a game via a "share faction" operation of a social networking input/output module 218, as described above. In addition, individual members of a faction may be influenced by importation of a non-player character from another game. As explained in the referenced application Ser. No. 62/138,920, non-player characters may develop unique personalities and attributes during game play. Users may therefore swap, gift, exclusive or non-exclusive copies of particular non-player characters with each other, via a social networking function. An "exclusive copy" of a character means a copy that is the only one that is allowed to be used within the players social network. That is, only one active copy is allowed at a time. "Non-exclusive" copies means more than one of the player's friends can download the character information and use it within a different game, at the same time.

Figure 4:
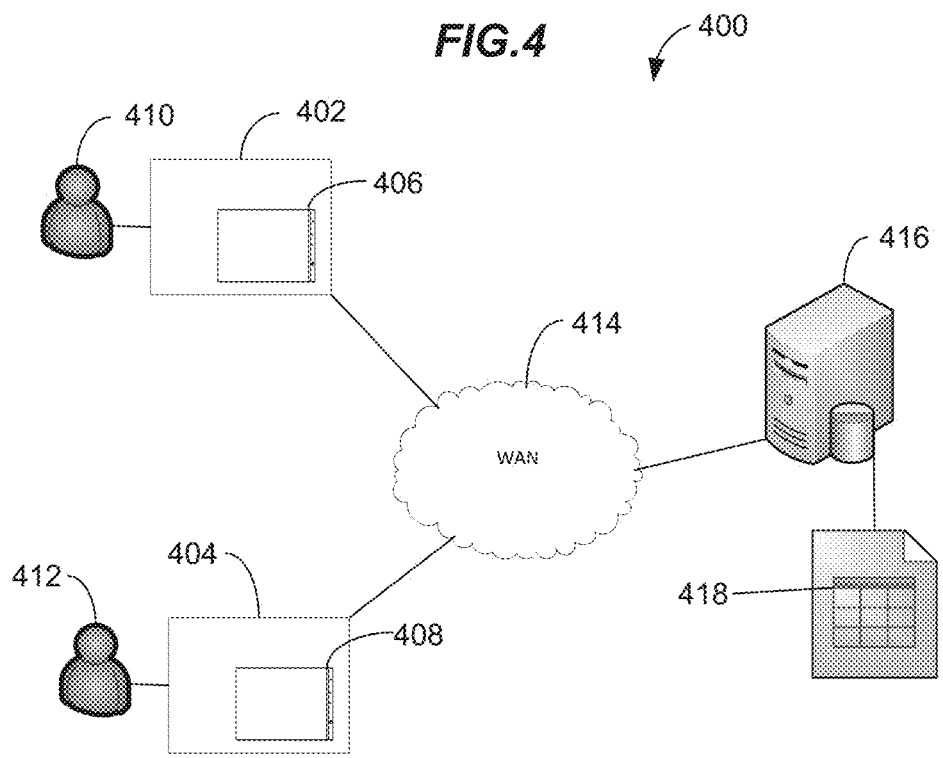
FIG. 4 is a block diagram illustrating aspects of a system for controlling a characteristic parameter of a 3D object or character included in a simulated 3D environment based on an event in a second game played by a second user not in synchrony with the game.

FIG. 4 shows other aspects of a system 400 including different users 410, 412 using corresponding game processes 406, 408 operating on separated computing machines 402, 404 that are in communication via a network 414 to a database server 416. The game processes may correspond in terms of environments or content, for example, they may be the same or compatible versions of a gaming application. However, the instances 406 and 408 may be completely independent, asynchronous processes running at different times (i.e., not in synchrony with the primary game process), with or without any overlapping time when both are running. The database server 416 may hold social networking data in a data structure 418 (e.g., a table or relational database) that relates users 410, 412 through a mutual friend relationship or the like. The server 416 may also operate a social functions management process in coordination with the game processes 406, 408. A social functions management process may manage each user's social network, facilitate communications between members, and respond to user requests and/or events of the game processes 406, 408. For example, the social functions management process may facilitate exchanges of data and permissions for a "revenge your friend" or "share your faction" feature as described above.

Figure 5:
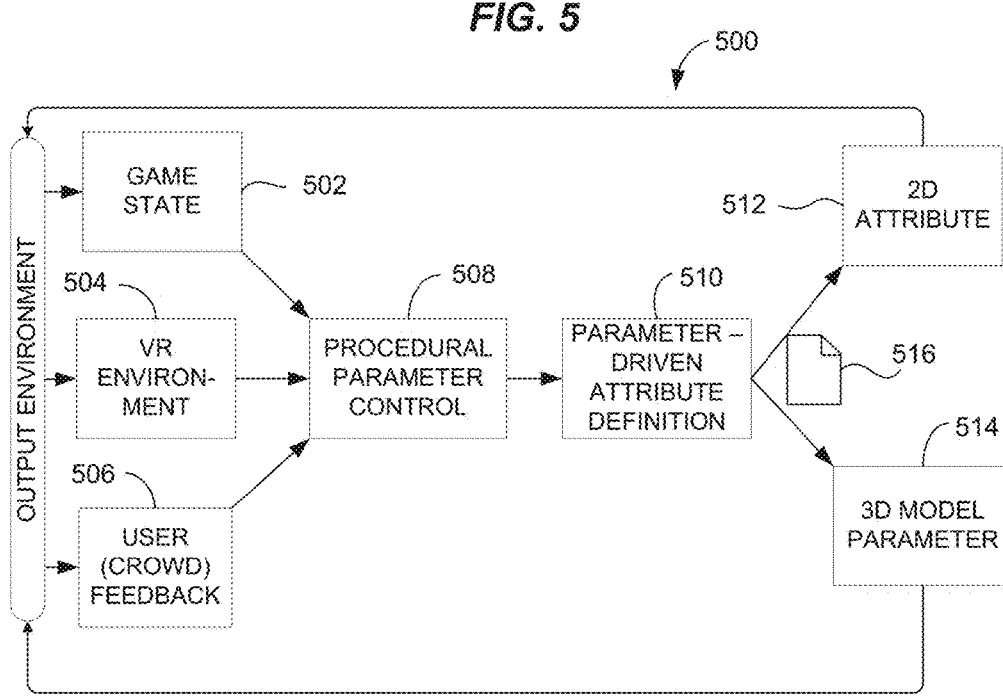
FIG. 5 is a block diagram illustrating aspects of controlling a characteristic parameter of a 3D object or character included in a simulated 3D environment based on feedback from multiple synchronous users of the VR experience or on a current state of at least one of the 3D environment, the game or the VR experience.

FIG. 5 is a concept diagram illustrating aspects of procedural attribute generation 500 responsive to game state, VR environment state, or crowd feedback. Parameterized 3D objects 514 are known in the art, for example having geometry that is partly defined by parameters such as length, width, height, angles between sides, and so forth. A morph of a surface mesh may be defined as a difference between a base mesh and a morphed mesh, either on a per-vertex basis or as a function of a relative position of a vertex, over a set of vertices. 2D attributes 512, such as for example diffuse color, bump, displacement, or other rendering parameter may also be determined procedurally. Procedures determine attributes of 3D objects, which may include non-player characters or avatars, at illustrated at box 510. A procedure 510 for developing model attributes may define an algorithm and parameters for driving the algorithm. The algorithm and parameters may be provided as data 516 to one or more rendering modules of a 3D environment engine, which produces a rendered environment output to a display device, that changes in response to user inputs per game rules or other rule set. At any point in time, the user inputs as interpreted by the applicable rule set produce a current game state 502 or non-game VR environment state 504. In aggregate, user inputs from multiple users of the same application can also be aggregated to produce a current user feedback state 506. State information 502, 504 or 506 vary with time in response to user inputs, based on one or more of a rule set for evaluating and using user data, past history of the 3D environment session, random or pseudo-random inputs, initial values of seed variables, and other inputs.

A process 508 operating in tandem with the 3D environment application may obtain state data, for example by reading state variable values from a memory or database of a local or remote process. These variable values generally change as a function of received user inputs, time, and events occurring in the 3D environment, whether the events are driven by user input or occur without user input (e.g., automatically). State variables may include, for example, for a game state 502, health, power, accessory, mood, wealth and other attributes associated with an avatar or non-player character, an avatar or character position, and so forth. In a VR environment, state variables 505 may include attributes similar to those in games, but may be driven by other processes. For example, a highly engaged and experienced avatar in a social networking environment may earn reputation points by performing actions conducive to community building, and so forth. User feedback states variables 506 may include, for example, averages, medians, or other aggregates or user feedback indicative of users' interest, approval, disproval, success, failure, or other reaction to events in the 3D environment. The process 508 may define, using an automatic algorithm, parameters for the procedural process 510, based on any one or more of the state data 502, 505, 506. For example, the process 508 may alter one or more parameters controlling, a surface contour, scale, or dimension of a 2D or 3D object, based on one or more of a player avatar's health, power, accessory, mood, wealth, social reputation, or based on aggregated interest data from a group of users.

Figure 6:
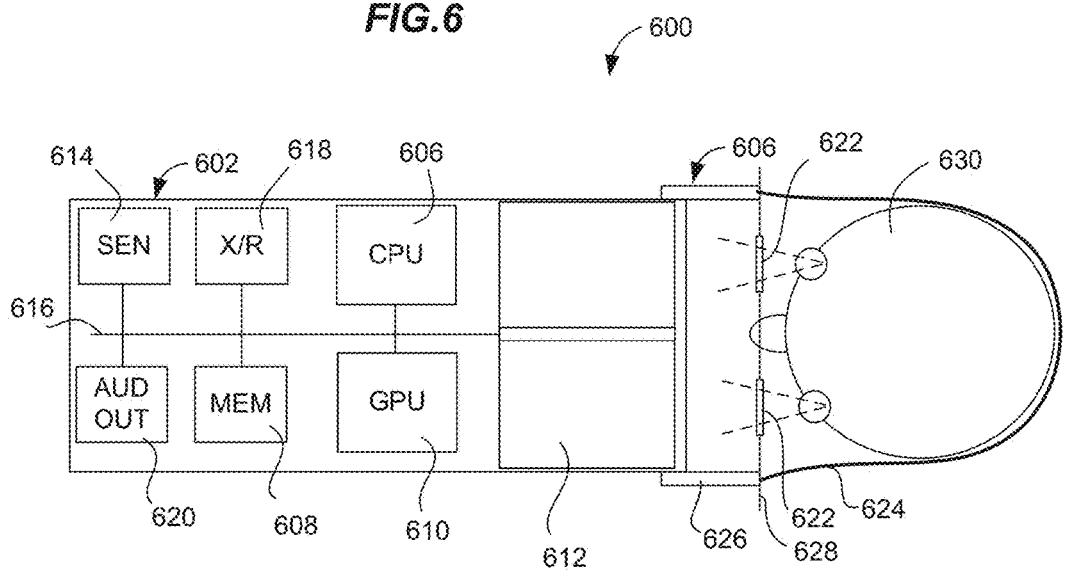
FIG. 6 is a diagram illustrating components of a stereoscopic display device for providing an immersive VR experience.

Any of the game features described herein may be executed in a game engine or other application for providing a 3D environment responsive to user input that produces VR output for an immersive VR headset or the like. FIG. 6 is a diagram illustrating one type of an immersive VR stereoscopic display device 600 may be provided in various form factors, of which device 600 provides but one example. The innovative methods, apparatus and systems are not necessarily limited to a particular form factor of immersive VR display, but may be used in a video output device that enables the user to control a position or point of view of video content playing on the device. Likewise, a VR or AR output device may manage an audio position or point of view of audio content playing on the device. The immersive VR stereoscopic display device 600 represents an example or a relatively low-cost device designed for consumer use.

The immersive VR stereoscopic display device 600 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 600 is designed to be worn close to the user's face, enabling a wide field of view using a small screen size such as typically found in present handheld tablet computing or smartphone devices. The support structure 626 may provide a fixed mounting for a pair of lenses 622 held in relation to the display screen 612. The lenses may be configured to enable the user to comfortably focus on the display screen 612 which may be held approximately one to three inches from the user's eyes.

The device 600 may further include a viewing shroud (not shown) coupled to the support structure 626 and configured of a soft, flexible or other suitable opaque material for form fitting to the user's face and blocking outside light. The shroud may be configured to ensure that the only visible light source to the user is the display screen 612, enhancing the immersive effect of using the device 600. A screen divider may be used to separate the screen 612 into independently driven stereoscopic regions, each of which is visible only through a corresponding one of the lenses 622. Hence, the immersive VR stereoscopic display device 600 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 600 may further comprise a bridge (not shown) for positioning over the user's nose, to facilitate accurate positioning of the lenses 622 with respect to the user's eyes. The device 600 may further comprise an elastic strap or band 624, or other headwear for fitting around the user's head and holding the device 600 to the user's head.

The immersive VR stereoscopic display device 600 may include additional electronic components of a display and communications unit 602 (e.g., a tablet computer or smartphone) in relation to a user's head 630. A support structure 604 (108, FIG. 1) holds the display and communications unit 602 using restraining device 624 that is elastic and/or adjustable to provide a comfortable and secure snug fit, for example, adjustable headgear. When wearing the support 602, the user views the display 612 though the pair of lenses 622. The display 612 may be driven by the Central Processing Unit (CPU) 602 and/or Graphics Processing Unit (GPU) 610 via an internal bus 616. Components of the display and communications unit 602 may further include, for example, a transmit/receive component or components 618, enabling wireless communication between the CPU and an external server via a wireless coupling. The transmit/receive component 618 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 618 may enable streaming of video data to the display and communications unit 602 from a local or remote video server, and uplink transmission of sensor and other data to the local or remote video server for control or audience response techniques as described herein.

Components of the display and communications unit 602 may further include, for example, one or more sensors 614 coupled to the CPU 606 via the communications bus 616. Such sensors may include, for example, an accelerometer/inclinometer array providing orientation data for indicating an orientation of the display and communications unit 602. As the display and communications unit 602 is fixed to the user's head 630, this data may also be calibrated to indicate an orientation of the head 630. The one or more sensors 614 may further include, for example, a Global Positioning System (GPS) sensor indicating a geographic position of the user. The one or more sensors 614 may further include, for example, a camera or image sensor positioned to detect an orientation of one or more of the user's eyes. In some embodiments, a cameras, image sensor, or other sensor configured to detect a user's eyes or eye movements may be mounted in the support structure 626 and coupled to the CPU 606 via the bus 616 and a serial bus port (not shown), for example, a Universal Serial Bus (USB) or other suitable communications port. The one or more sensors 614 may further include, for example, an interferometer positioned in the support structure 604 and configured to indicate a surface contour to the user's eyes. The one or more sensors 614 may further include, for example, a microphone, array or microphones, or other audio input transducer for detecting spoken user commands or verbal and non-verbal audible reactions to display output. The one or more sensors may include, for example, electrodes to sense heart rate, a temperature sensor configured for sensing skin or body temperature of the user, or other medical sensors for collecting biofeedback data.

For immersive VR or similar output modalities, the story content of a movie or the like may be enhanced, without eliminating the essence of scripted entertainment that a participant or user (who is visually, aurally and cognitively immersed) can more or less passively enjoy. For example, allowing users to move the viewpoint to see items occluded in the main view as a scene unfolds may enable such users to absorb dramatic details that enhance understanding of the plot, add emotional impact, foreshadow events to come, or otherwise enhance enjoyment of a scripted storyline. An example of foregoing is enhancing story telling by user-selected depth of focus about feedback loops among an interactive VR narrative (or whatever form the story/presentation takes, so hereafter 'the narrative'), and at least two sense modalities plus one cognitive item.

As used herein, "focus distance" refers to distance between the camera and the location in the scene having the sharpest focus. The focus distance increases as the location of sharpest focus moves further from the camera. In traditional filmmaking, the location of sharpest focus in the scene in front of the camera, and can often be adjusted by the camera operator or director to isolate a viewer's attention to the particular element or subject in the scene. In both 2D monoscopic imaging and 3D stereoscopic imaging, the lenses in the viewer's eyes are focused on the display or screen on which the viewer is looking. In 2D monoscopic imaging, the viewer's eyes are also converged on the screen or display itself, while in 3D stereoscopic imaging the viewer's eyes will converge in front of screen, at the screen or behind the screen, depending on the location of the image of the object that the viewer is looking at. Stereoscopic content is often created with camera settings that make the entire scene in acceptable focus which allows the user to look around the scene at any object, and while this may sometimes provide an acceptable viewing experience and allow the user to rapidly look at different objects in the scene, it does not produce a result that mimics viewing physical objects in reality. When a human views physical objects in the real world, the human eye is focused and converged at the same location in space where the physical objects exist, which makes the objects in the scene that are far away from this focus and convergence location point blurry (lacking sharp focus). If the convergence location of the eyes of the viewer wearing the VR headset can be detected with a camera or sensor within the VR headset that is imaging the viewer's eyes, then a more realistic virtual experience can be created if the depth of field in the virtual scene were to be limited and centered at this convergence distance by setting the virtual camera's focus distance to this detected convergence distance. Additionally, in order to isolate the viewer's attention to particular regions of the scene for narrative purposes, the focus distance in the virtual camera can be set to correspond to particular regions of the scene. The depth of field can be narrowed by using a larger lens aperture on the camera (smaller lens f-number) to further isolate a particular object or region in the scene.

The two sense modalities may include sight and sound. Thinking of the head-mounted display+audio examples, the user sees some field of view and hears some aurally presented sound field. The cognitive item is understanding the language, perhaps dialog or voice over or other narrative element. In each case, the narrative can influence or be influenced by the sense modalities and/or the cognition. For example, a visual event (for example, appearance of a bright light in an otherwise uniformly dim background) may occur somewhere in the far left distance of the presented visual field. This can draw the user's attention and actual visual focus. For further example, an aural event (for example, a loud sound in an otherwise uniformly low volume background) may occur somewhere in the right far distance of the presented sound field. This can also draw the user's attention and focus. For yet further example, an announcer (for example, a voice-over in a game involving an attack on a castle, which the user is inside of) may remark "And now, the threatened attack begins over the central castle wall." This may draw both the user's attention and visual focus, either in anticipation of the attack, or as the marauders appear at the central parapets.

In addition, or in the alternative, the participant's visual, aural or cognitive focus may influence the narrative. For example, the user focuses on the left far distance of the presented visual field—for good reasons or none—and since the biometric feedback mechanism in the head-mounted display can detect this focus, an event may be caused to occur there, or nearby, or in a completely different part of the visual field if this somehow advances the narrative. For further example, the user focuses his or her aural attention some place in the sound field, perhaps craning his or her neck or otherwise signaling this aural focus, and an aural event can be caused to occur there, or nearby, or in a completely different part of the sound field if this somehow advances the narrative. For yet a further example, a user may react to some event(s) by either uttering some reflexive sound (e.g. "Oh!" or "Aha" or some such), or by actually stating or otherwise saying something (e.g. "I can see them coming over the hill," regardless of whether there actually is something to see coming over the hill), and the upshot can be that indeed something happens at the crest of the hill, or nearby, or in a completely different place if that somehow advances the narrative.

Events or visual/aural/cognitive objects of interest may coincide in many cases. Or they may not, as differences in what the visual, aural and cognitive fields present may be part of what builds tension or some other worthwhile advancement for the narrative. Sometimes dialog or a voice over may cross over from cognitive to aural stimulus, i.e. the whispered dialog may be coming from some place that attracts attention not only because of what the words mean, but simply because the sounds come from that point of origin. Still, the overriding consideration is that there are at least three types of events—visual, aural and cognitive (and blends thereof)—that can either prompt responses in the participant, or that can occur as a consequence of the participant's visual, aural and/or cognitive focus. The present application discloses technical means for accomplishing these and other forms of interactivity with VR content.

Sensor data from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible. "Non-real time" refers to batch processing or other use of sensor data that is not used to provide immediate control input for controlling the display, but that may control the display after some arbitrary amount of delay.

Components of the display and communications unit 602 may further include, for example, an audio output transducer 620, for example a speaker or piezoelectric transducer in the display and communications unit 602 or audio output port for headphones or other audio output transducer mounted in headgear 624 or the like. The audio output device may provide surround sound, multichannel audio, so-called 'object oriented audio', or other audio track output accompanying a stereoscopic immersive VR video display content. Components of the display and communications unit 602 may further include, for example, a memory device 608 coupled to the CPU 606 via a memory bus. The memory 608 may store, for example, program instructions that when executed by the processor cause the apparatus 600 to perform operations as described herein. The memory 608 may also store data, for example, audio-video data in a library or buffered during streaming operations. Further details regarding generation and use of VR environments may be as described in U.S. Provisional Patent Application Ser. No. 62/088,496, filed Dec. 5, 2014, which is incorporated herein in its entirety by reference.

Figure 7:
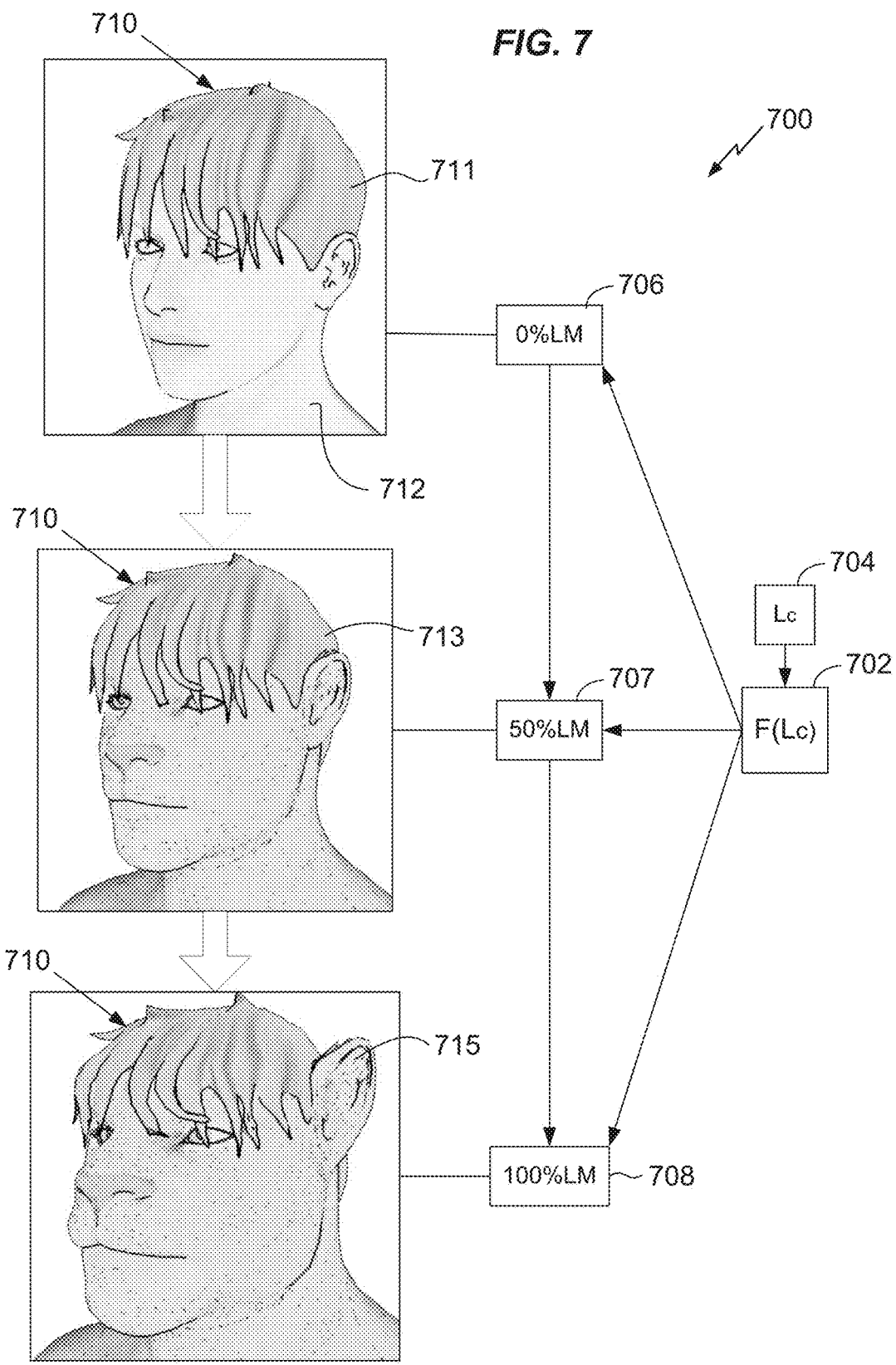
FIG. 7 is a diagram illustrating aspects of controlling a morphological characteristic parameter of a 3D object or character based on one or more state variables.

Referring to FIG. 7, general aspects 700 of controlling a surface contour or "morph" of a 3D object 710 in response to a 3D environment state variable are illustrated. In this example, the 3D object 710 is a character or avatar to which a character morph is applied to a surface contour 712 defined by a three-dimensional mesh (not shown). The character morph may change a size or appearance of a rendered object, by applying a predetermined difference operation each vertex of a base mesh shown in the topmost box of a human-shaped character and the morph target. When fully applied, the morph target imparts a lion-like appearance to the character 710, as shown in the bottommost box. A function 702 may determine an amount of the morph target to apply based on one or more variables 704 linked to the lion morph. For example, the function 702 may track a "lion-like" attribute of a player's avatar based on a rolling average of past play style and achievements 704. When no "lion-like" points are counted, at 706, the morph is not applied, resulting in the normal human appearance 711. If player conduct results in a degree of lion-like attributes, the function may set a proportion of the morph target accordingly. For example, if the player displays 50% of the maximum possible lion-like behavior attribute as shown at 707, the player avatar may be displayed with 50% on the morph applied changing the surface contour to resemble a lion as shown in the intermediate box 713. The surface color (texture) and other 2D attributes may similarly be adjusted by blending texture maps between human and lion textures based on the current proportion. At 708, the function 702 has scored the player at 100% or maximal lion-like behavior, and the maximal morph is applied as shown in the bottom box 715. If the function 702 is based on a rolling average, the processor may cause the avatar appearance to gradually revert back towards the human form if the player avoids lion-like behavior while continuing to play, as the rolling average computed by the function 702 diminishes accordingly.

Figure 8:
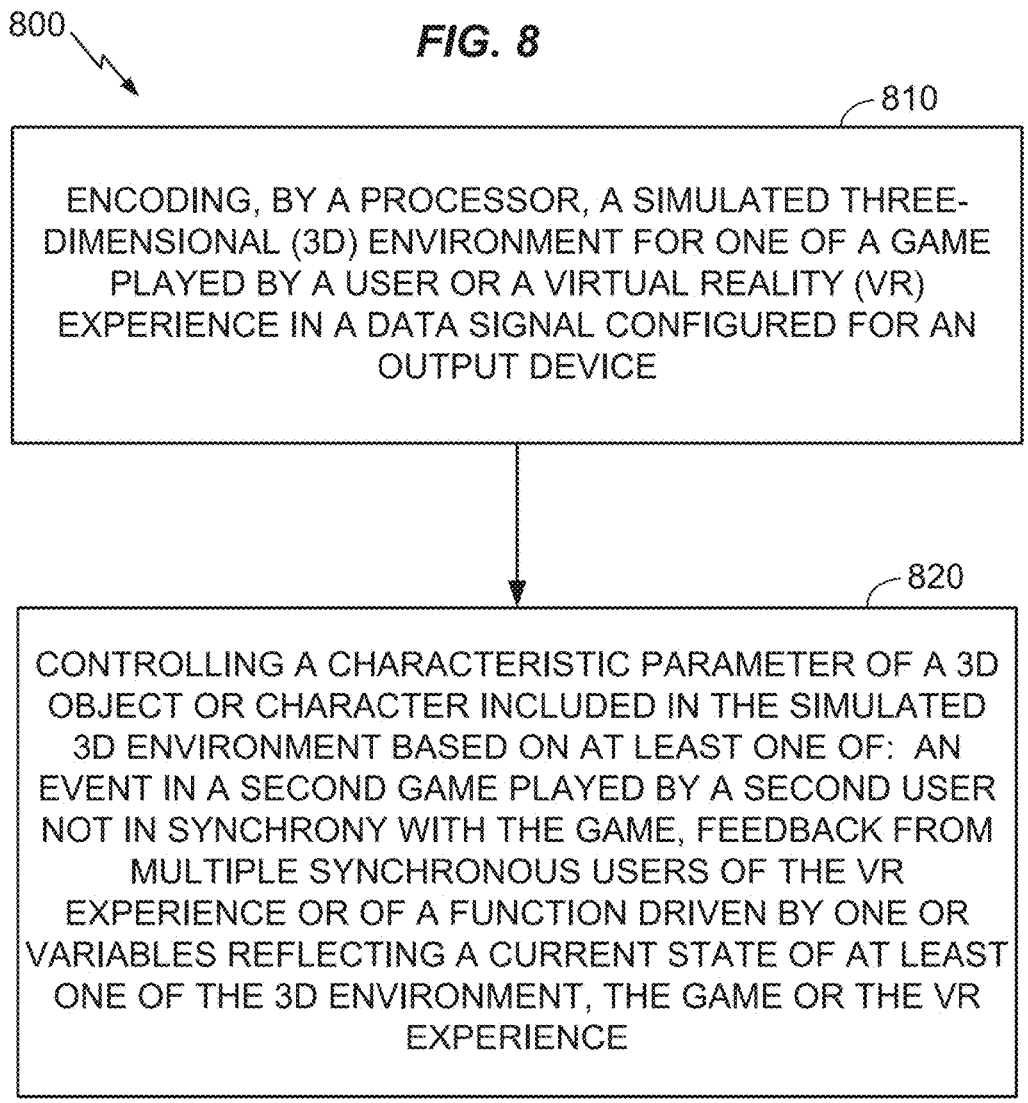
FIG. 8 is a flow chart illustrating a method for controlling a characteristic parameter of a 3D object or character included in the simulated 3D environment based on at least one of: an event in a second game played by a second user not in synchrony with the game, feedback from multiple synchronous users of the VR experience, or on a function driven by one or variables reflecting a current state of at least one of the 3D environment, the game or the VR experience.

In view the foregoing, and by way of additional example, FIGS. 8-11 show aspects of a method or methods of controlling a 3D environment, as may be performed by a game engine or other computing apparatus described herein. Referring to FIG. 8, a computer-implemented method 800 may include, at 800, providing, by a processor, a simulated three-dimensional (3D) environment in a computer memory or storage device for one of a game played by a user or a virtual reality (VR) experience in a data signal configured for an output device. For example, the processor may execute a game engine to provide a video game in a 3D environment, or a more open-ended simulated 3D environment such as a social networking venue, instructional venue, shopping venue, or the like. The providing may include, for example, encoding the simulated 3D environment in a file format used for 3D data in games, for example, in the Virtual Reality Modeling Language (VRML), X3D, COLLADA, U3D, or other format. The providing may further include outputting the data signal via an output port to the client device, using a serial, WiFi, Ethernet, or other connection, causing a video depiction of the 3D environment to appear on a display of the client device, for example, on a display screen of a VR or AR device.

The method 800 may further include, at 820, controlling by the processor a characteristic parameter of a 3D object or character included in the simulated 3D environment based on at least one of: an event in a second game played by a second user not in synchrony with the game, synchronous feedback from multiple synchronous users of the VR experience or of a function driven by one or more variables reflecting a current state of at least one of the 3D environment, the game or the VR experience. Examples of each of these types of control have been provided on the description above. For example, features such as "avenge your friend" or "share your faction" involve controlling a current game parameter using an event in a second game played by a second user not in synchrony with the game. For further example, controlling an avatar or character morph involves controlling a current 3D environment parameter by a function driven by one or variables reflecting a current state of at least one of the 3D environment, the game or the VR experience. Crowd feedback can similarly be used. The controlling may include synchronous, near real-time feedback based on encoded signals from independent game terminals (e.g., VR or VA client devices). The characteristic parameter of the 3D object may include, for example, any one or more of a morph state of a character mesh, a current configuration of a character texture map, or a character trait variable. Further discussion of character parameters is provided in the discussion above, for example, in connection with FIGS. 5 and 7.

The method 800 may include any one or more of additional operations 900, 1000 or 1100, shown in FIGS. 9, 10 and 11, in any operable order. Each of these additional operations is not necessarily performed in every embodiment of the method, and the presence of any one of the operations 900, 1000 or 1100 does not necessarily require that any other of these additional operations also be performed.

Referring to FIG. 9, the method 800 may further include, at 910, selecting by the processor the second game based on a social relationship between the user and the second user indicated in a memory coupled to the processor. For example, the second user and the user may be mutual friends in a social network, in a relationship that permits the user to have access to a database of past game play by the second user. The method 800 may further include, at 920, including an invitation in the data signal for the user to perform an action in the game based on the event in the second game. For example, if the database reflects that the second user was killed by a certain character, a database server may send an indication to the processor of a local game machine, which may provide the user with an option to "avenge your friend." If the user selects the option, the processor may generate the character against which the revenge is to be taken in the game. For further example, if the second player has designated an earned game feature, for example a faction, for sharing, the processor may provide the user with an option to access the feature from the other, asynchronous game in the current game. For example, as shown at 930, the invited action may include at least one of interacting with a character from the second game, or with a faction of characters from the second game. Accordingly, in an aspect as shown at 940, controlling the parameter may include at least one of configuring a character in the game based on a character in the second game, or configuring a faction of characters in the game based on a faction in the second game. Configuring a character may include changing character game traits as described herein above. Configuring a faction of characters may include setting an identity and rank of each faction member to a definite value. Configuring may include, for example, setting memory locations or variable to defined values that when interpreted by the game engine and incorporated into game action, cause expression of the character trait or character interactions based on faction membership, as also described herein above. As used herein, a "characteristic parameter" of a 3D object or character excludes position, orientation and movement data controlling the location, orientation or movement of game characters, and encompasses numeric values that determine a character's three-dimensional shape or coloration used as input for rendering, and variables other than position, orientation or movement used in determining outcomes of the character's interactions with other game characters and game objects, for example character traits are discussed herein above.

Referring to FIG. 10, the method 800 may further include, at 1010, the processor receiving the feedback from multiple synchronous users of the VR experience from a network, and controlling the characteristic parameter of the 3D object in response to the feedback. For example, a database server may collect feedback including user rating or reaction data for a shared experience such as a VR movie or instructional experience being experienced at the same time, or nearly the same time, and provide the feedback to a local VR engine. The local VR engine executed by the processor may then control a characteristic parameter of the 3D object or character based on the feedback. For example, at 1020, controlling the parameter at least one of changing at least one of a dimension, a surface contour, an animation sequence, or a surface texture of the 3D object. Changing a contour and surface texture are described above in connection with FIG. 7 above. In another aspect, at 1030, controlling the parameter may include changing the parameter based on an aggregated value derived in near real-time from the feedback. For example, depending on near real-time feedback (e.g., feedback gathered within a rolling window of five seconds or less) an object parameter may be changed to reflect a dominant audience preference, which changes with time, accordingly driving frequent changes in the object parameter.

Referring to FIG. 11, the method 800 may further include, at 1100, reading at least one state variable indicating the current state of at least one of the 3D environment, the game or the VR experience, and providing the at least one state variable to the function driven by the one or more variables, executing by the processor. In an aspect indicated at 1120, the at least one variable may include a character health status, and the function may include determining an amount of a predefined morph to apply to a surface contour of the character, based on the health status. For example, the three-dimensional contour of a wound may vary based on a current health status of an avatar or non-player character. For an additional example of changing a surface contour, see FIG. 7 and accompanying description above.

Figure 12:
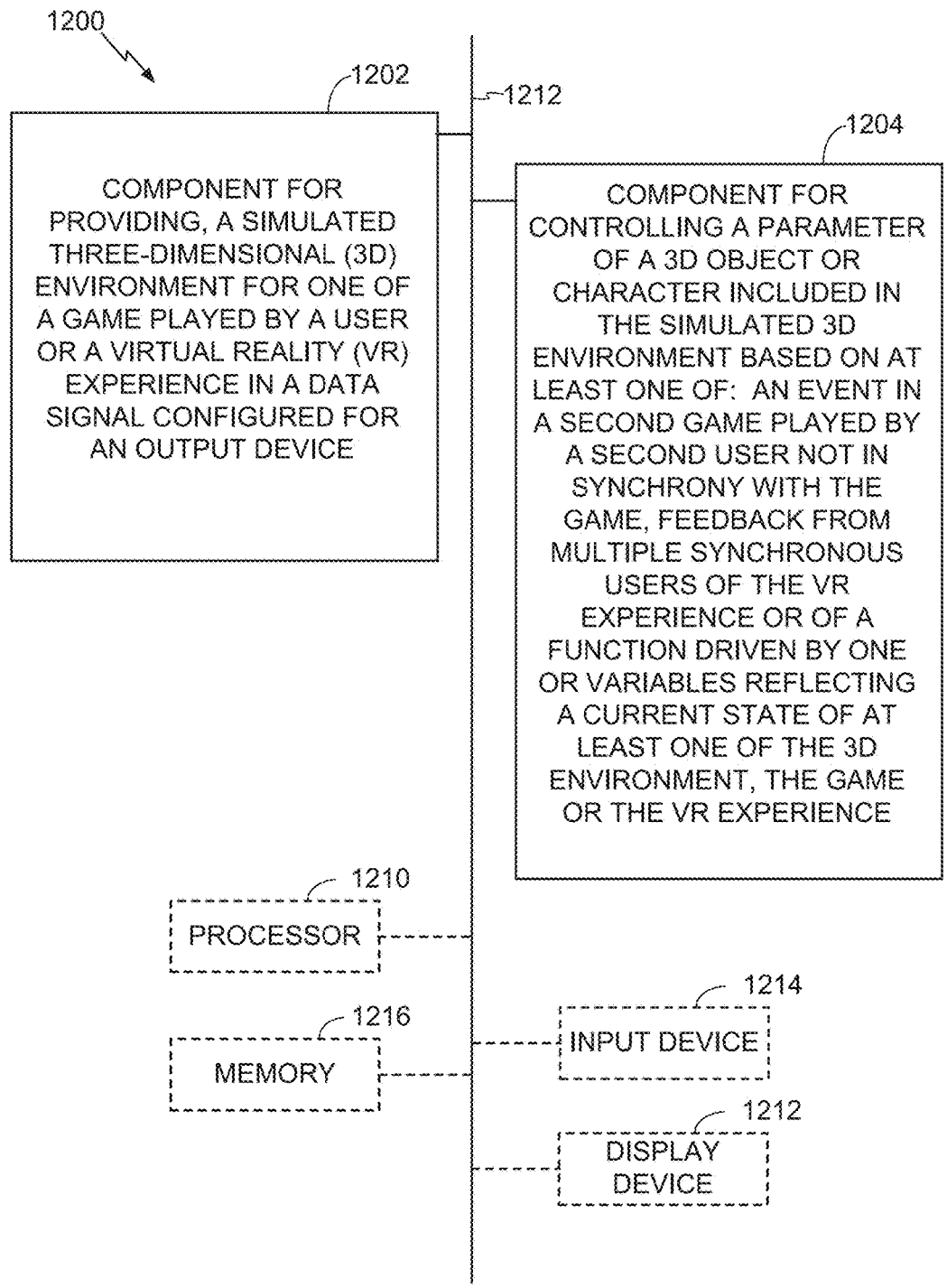
FIG. 12 is a conceptual block diagram illustrating components of an apparatus or system for controlling a characteristic parameter of a 3D object or character included in the simulated 3D environment.

FIG. 12 is a conceptual block diagram illustrating components of an apparatus or system 1200 for controlling a 3D environment as described herein. The apparatus or system 1200 may include additional or more detailed components as described herein. For example, the processor 1210 and memory 1216 may contain an instantiation of a 3D environment application as described herein above, including the more detailed components pointed out in FIG. 12 and other ancillary components. As depicted, the apparatus or system 1200 may include functional blocks that can represent functions implemented by a processor, software, or combination thereof (e.g., firmware).

As illustrated in FIG. 12, the apparatus or system 1200 may comprise an electrical component 1202 for providing, a simulated 3D environment for one of a game played by a user or a VR/AR experience in a data signal configured for an output device. The component 1202 may be, or may include, a means for providing this experience. Said means may include the processor 1210 coupled to the memory 1216, and to the input device 1214, the processor executing an algorithm based on program instructions stored in the memory. Such algorithm may include a sequence of more detailed operations, for example, retrieving 3D model data, manipulating the 3D data in response to user input within a representation of a 3D scene, and rendering the representation to provide a sequence of video frames.

The apparatus 1200 may further include an electrical component 1204 for a means for controlling a characteristic parameter of a 3D object or character included in the simulated 3D environment based on at least one of: an event in a second game played by a second user not in synchrony with the game, feedback from multiple synchronous users of the VR experience or a function driven by one or variables reflecting a current state of at least one of the 3D environment, the game or the VR experience. The component 1204 may be, or may include, the means for controlling the characteristic parameter of a 3D object or character included in the simulated 3D environment. Said means may include the processor 1210 coupled to the memory 1216, and to the input device 1214, the processor executing an algorithm based on program instructions stored in the memory. Such algorithm may include a sequence of more detailed operations, for example, and one or more of the more detailed operations described in connection with FIGS. 9-10, or otherwise described above.

The apparatus 1200 may optionally include a processor module 1210 having at least one processor, in the case of the apparatus 1200 configured as a data processor. The processor 1210, in such case, may be in operative communication with the modules 1202-1204 via a bus 1212 or similar communication coupling. The processor 1210 may effect initiation and scheduling of the processes or functions performed by electrical components 1202-1204.

In related aspects, the apparatus 1200 may include a network interface module (not shown) operable for communicating with a game server over a computer network, enabling collection of game state or user feedback from related games operating at other game terminals. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1204, and subcomponents thereof, or the processor 1210, or the method 1100 and one or more of the additional operations 900, 1000 or 1100 disclosed herein. The memory module 1216 may retain instructions for executing functions associated with the modules 1202-1204. While shown as being external to the memory 1216, it is to be understood that the modules 1202-1204 can exist within the memory 1216.

The apparatus 1200 may include a display device 1215, which may include one or more display outputs (e.g., LCD display screens or DLP projectors) coupled to the processor 1210 via a bus 1212 and a graphics processing unit (not shown). Other outputs may include, for example, an audio output transducer (not shown). The input device 1214 may comprise any suitable device for obtaining player input, examples of which are provided herein above.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method comprising:
providing, by a processor, a data signal configured for an output device, wherein the data signal encodes a first game for play in a simulated three-dimensional (3D) environment by a first user;
controlling a characteristic parameter of a 3D object or character included in the simulated 3D environment based on an event in a second game played by a second user not in synchrony with the first game, wherein the second game is independent of the first game prior to the event, and the event includes an interaction between an avatar of the second user and at least one of a non-player character or avatar operated in the second game.

2. The method of claim 1, further comprising selecting the second game based on a social relationship between the first user and the second user indicated in a memory coupled to the processor.

3. The method of claim 2, further comprising including an invitation in the data signal for the user to perform an action in the first game based on the event in the second game.

4. The method of claim 3, where the invited action comprises at least one of interacting with a character from the second game, or with a faction of characters from the second game.

5. The method of claim 4, wherein controlling the parameter comprises at least one of configuring a character in the first game based on a character in the second game, or configuring a faction of characters in the first game based on a faction in the second game.

6. The method of claim 1 further comprising receiving the feedback from multiple synchronous users of the first game from a network, and controlling the characteristic parameter of the 3D object in response to the feedback.

7. The method of claim 6, wherein controlling the parameter comprises changing at least one of a dimension, a surface contour, an animation sequence, or a surface texture of the 3D object.

8. The method of claim 6, wherein controlling the parameter comprises changing the parameter based on an aggregated value derived in near real-time from the feedback.

9. The method of claim 1, further comprising reading at least one state variable indicating the current state of at least one of the 3D environment and the game, and providing the at least one state variable to the function.

10. The method of claim 9, wherein the at least one variable comprises a character health status, and the function comprises determining an amount of a predefined morph to apply to a surface contour of the character, based on the health status.

11. An apparatus for controlling a simulated three-dimensional (3D) environment, comprising:
 a processor, a memory coupled to the processor, and a stereoscopic display device coupled to the processor, wherein the memory holds instructions that when executed by the processor, cause the apparatus to perform the operations of:
 providing, by a processor, a data signal configured for an output device, wherein the data signal encodes a first game for play in a simulated three-dimensional (3D) environment by a first user;
 controlling a characteristic parameter of a 3D object or character included in the simulated 3D environment based on an event in a second game played by a second user not in synchrony with the first game, wherein the second game is independent of the first game prior to the event, and the event includes an interaction between an avatar of the second user and at least one of a non-player character or avatar operated in the second game.

12. The apparatus of claim 11, wherein the memory holds further instructions for selecting the second game based on a social relationship between the first user and the second user indicated in a memory coupled to the processor.

13. The apparatus of claim 12, wherein the memory holds further instructions for including an invitation in the data signal for the first user to perform an action in the game based on the event in the second game.

14. The apparatus of claim 13, wherein the memory holds further instructions for including the invitation wherein the invited action comprises at least one of interacting with a character from the second game, or with a faction of characters from the second game.

15. The apparatus of claim 14, wherein the memory holds further instructions for controlling the parameter at least in part by configuring a character in the first game based on a character in the second game, or configuring a faction of characters in the game based on a faction in the second game.

16. The apparatus of claim 11, wherein the memory holds further instructions for receiving feedback from multiple synchronous users of the first dame from a network, and controlling the characteristic parameter of the 3D object in response to the feedback.

17. The apparatus of claim 16, wherein the memory holds further instructions for controlling the parameter at least in part by changing at least one of a dimension, a surface contour, an animation sequence, or a surface texture of the 3D object.

18. The apparatus of claim 16, wherein the memory holds further instructions for controlling the parameter at least in part by changing the parameter based on an aggregated value derived in near real-time from the feedback.

19. The apparatus of claim 11, wherein the memory holds further instructions for reading at least one state variable indicating the current state of at least one of the 3D environment and the game, and providing the at least one state variable to the function.

20. The apparatus of claim 19, wherein the memory holds further instructions for reading the at least one variable comprising a character health status, and the function comprises determining an amount of a predefined morph to apply to a surface contour of the character, based on the health status.

* * * * *